Sept. 11, 1962
H. A. GEIPEL
3,053,328
SOD HARVESTING MACHINE
Filed July 17, 1961
3 Sheets-Sheet 1
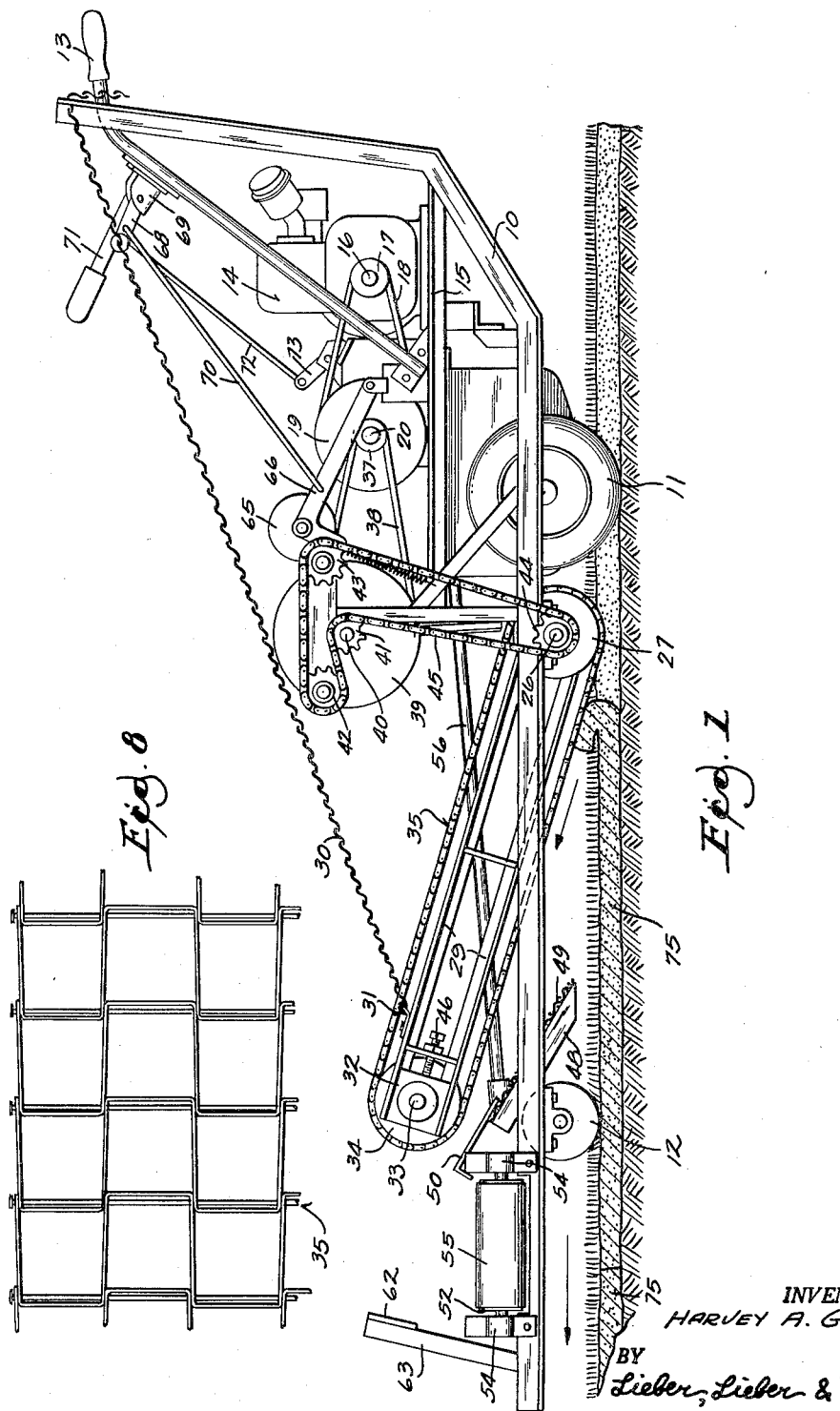
INVENTOR.
HARVEY A. GEIPEL
BY
Lieber, Lieber & Niller
ATTORNEYS

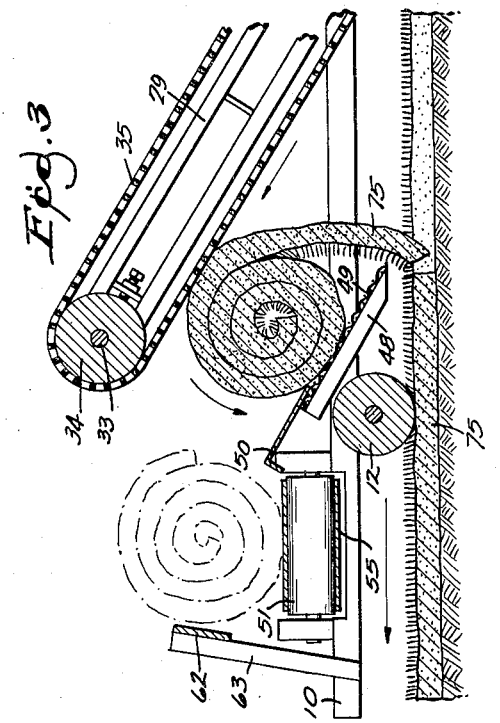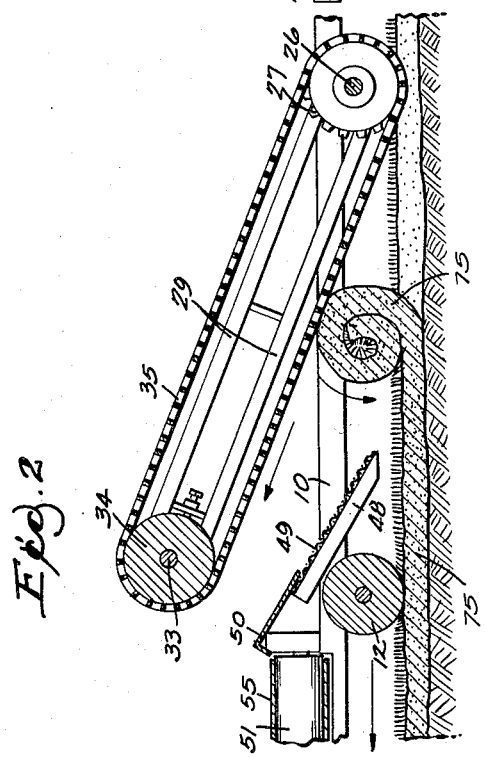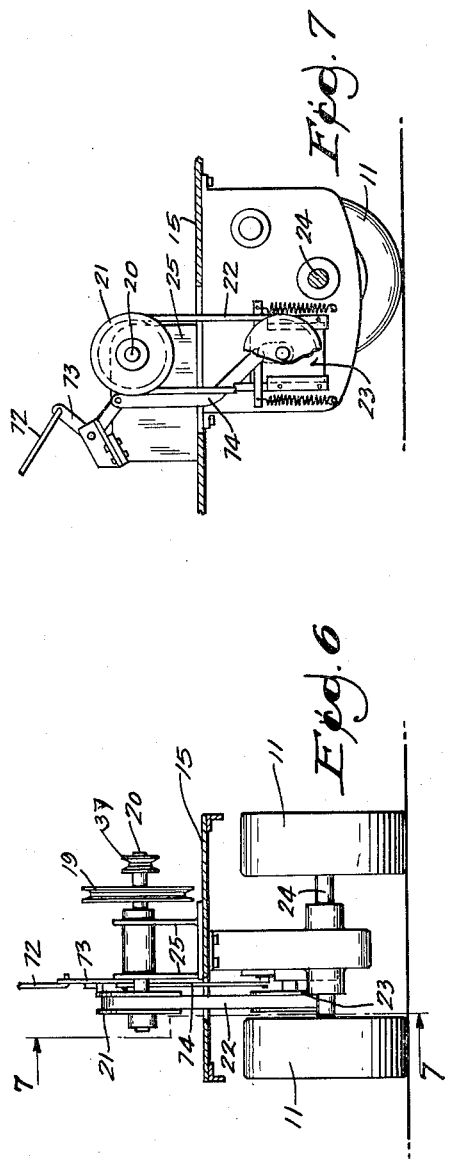

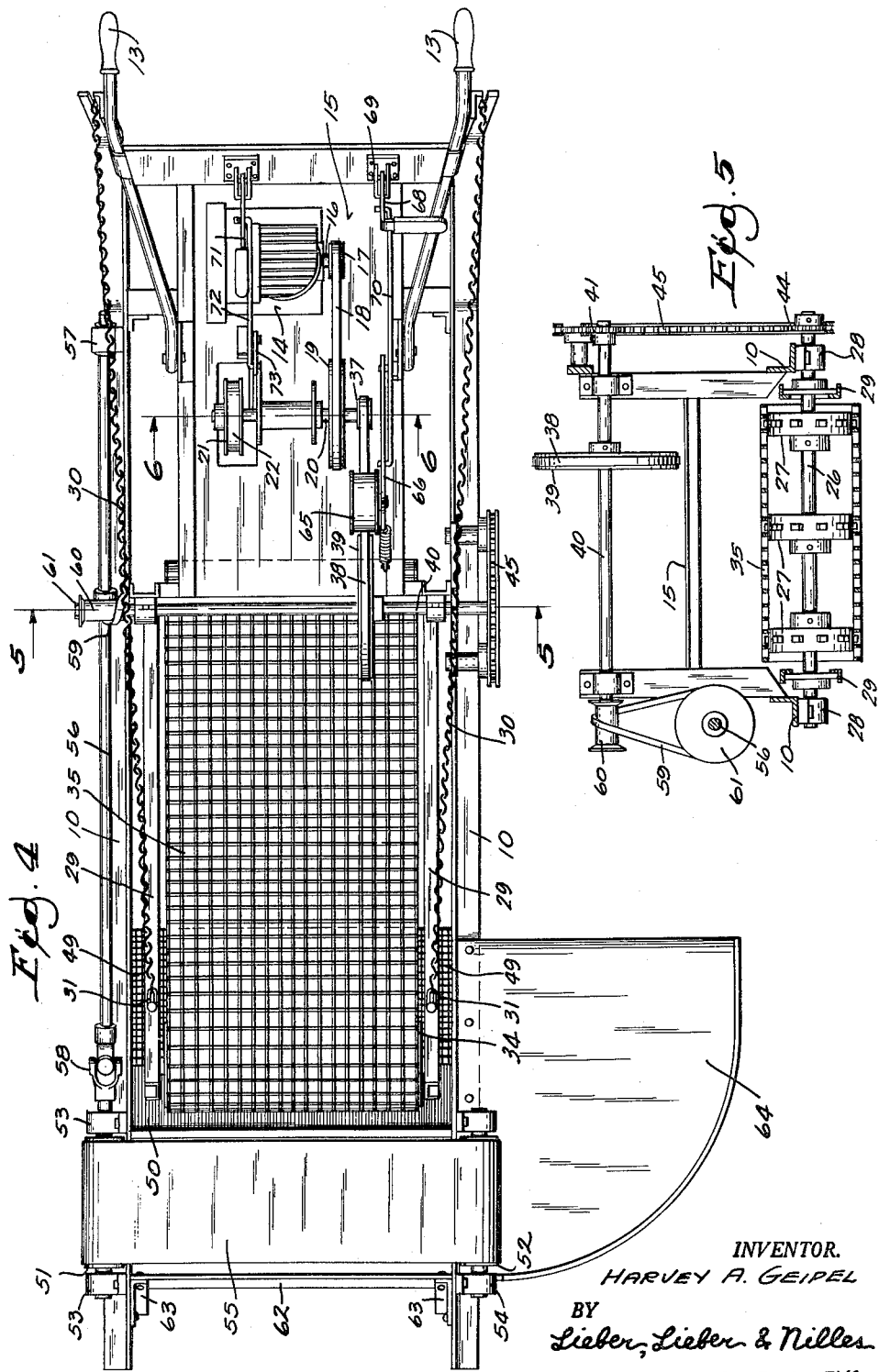

United States Patent Office 3,053,328
Patented Sept. 11, 1962

3,053,328
SOD HARVESTING MACHINE
Harvey A. Geipel, Milwaukee, Wis., assignor to Nu Industries, Inc., Milwaukee, Wis., a corporation of Wisconsin
Filed July 17, 1961, Ser. No. 124,431
14 Claims. (Cl. 172—19)

The present invention relates generally to improvements in the art of gathering sod, and relates more particularly to the provision of an improved power operated device for removing strips of sod from the ground, rolling the strips in convenient bundles and depositing the same to one side of the device.

A primary object of the invention is to provide a new and improved sod harvester which is automatic and efficient in operation, compact and durable in construction, and flexible in its adaptations.

Another important object of this invention is to provide an improved power operated machine which is adapted to automatically roll sod strips in neat and compact individual rolls with a minimum of damage and with utmost efficiency and uniformity.

Still another object of my present invention is to provide a novel and improved power operated sod harvesting machine which is readily maneuverable for the rapid and effective removal of pre-cut sod strips from the ground in a continuous manner and with a minimum of effort on the part of the operator.

An additional object of the present invention is to provide an improved machine for continuously removing a succession of flat sod strips cut to any desired lengths from the ground, neatly and uniformly rolling the successive strips in an automatic manner while depositing the same on a transverse conveyor, and finally depositing the sod rolls in succession laterally of the machine.

These and other objects and advantages of the invention will become apparent from the following detailed description taken in conjunction with the accompanying drawings wherein like reference characters designate the same or similar parts in the several views.

FIG. 1 is a side elevational view of a typical sod handling machine embodying the present invention and showing a sod strip being initially contacted at the commencement of a rolling operation;

FIG. 2 is a fragmentary longitudinal section of the sod rolling mechanism of the machine showing the sod strip in the intermediate stages of the rolling operation;

FIG. 3 is another fragmentary longitudinal section of the sod rolling and conveying mechanism but showing the sod strip in the final stage of the rolling operation, a completed roll of sod being shown in broken lines on the transverse conveyor;

FIG. 4 is a top view of the machine showing a side delivery platform secured to the frame for receiving the successive sod rolls from the conveyor;

FIG. 5 is a transverse section through the sod rolling mechanism of the machine taken along the line 5—5 of FIG. 4;

FIG. 6 is another transverse section through the drive mechanism taken along the line 6—6 of FIG. 4;

FIG. 7 is a section through the drive taken along the irregular line 7—7 of FIG. 6; and FIG. 8 is an enlarged fragmentary plane view of the sod engaging and rolling belt.

While the improvements have been specifically shown and described herein as being especially advantageously embodied in a portable hand guided sod harvester for operating on pre-cut strips of sod of given lengths, it is not intended to thereby limit or restrict the use or utility of the invention by reason of such specific embodiments since the improvements could also be used to advantage in a tractor propelled device and also in direct combination with a sod cutter. It is also intended that certain specific descriptive terms used herein shall be given the broadest possible interpretation consistent with the disclosure.

Referring to the drawing, the improved sod harvesting machine shown therein comprises, in general, a main frame 10 provided with a pair of rear ground engaging drive wheels 11 and front ground engaging guiding and supporting wheels 12, the frame 10 also having a pair of rearwardly projecting manipulating handles 13 secured thereto. The prime mover, shown as being in the form of an air cooled internal combustion engine 14, is mounted on a platform 15 at the rear of the frame 10 above the drive wheels 11 and transmits power through its drive shaft 16, sheave 17, belt 18, sheave 19, shaft 20, transmission sheave 21, belt 22 and clutch 23 to the driven shaft 24 of the wheels 11, the shaft 20 and sheaves 19, 21 also being carried by the platform 15 as by means of a suitable bracket 25 secured thereto.

Swingably carried at the rear end thereof by a pivot shaft 26 having sprocket wheels 27 keyed thereto and journalled in suitable bearings 28 mounted on the frame 10 forwardly of and in proximity to the drive wheels 11 is an elongated frame 29, the frame 29 being inclined upwardly in a forward direction to a position wherein the free swing-end thereof is located above the front guide wheels 12 and being supported in such inclined position by a pair of flexible chains or cables 30 or the like secured at one end as at 31 to the frame 29 and adjustably secured in a suitable manner at the other end to the frame 10 near the handles 13. The opposite sides of the elevated forward end of the frame 29 are provided with adjustable bearing blocks 32 in which a shaft 33 is journalled for free rotation, the shaft 33 carrying an idler roller 34, and an endless open mesh belt 35 passes about the spaced axially alined sprocket wheels 27 and the idler roll 34 with the cogs or teeth of the wheels 27 drivingly engaging the open mesh belt 35. The belt 35 is also driven by the engine 14 through the sheave 17, belt 18, sheave 19, shaft 20, sheave 37, belt 38, sheave 39, shaft 40, sprocket wheels 41, 42, 43, 44 and chain 45, the sprocket wheel 44 being keyed to the shaft 26 to drive the sprocket wheels 27 therewith, and it will be noted that the mesh belt 35 is thus driven in a direction opposite to the direction in which the drive wheels 11 are driven, the tension on the belt 35 being adjustable through the bearing blocks 32 as by means of a jack screw 46 or the like. The power transmission sheaves and sprocket wheels should also be relatively sized so as to drive the belt 35 at a somewhat faster linear rate of speed than the peripheral speed of the drive wheels 11, and the apparatus thus described and including the reversely driven mesh belt 35 constitutes the sod rolling portion of the machine.

Rigidly secured to the main frame 10 in a suitable manner as by means of spaced angle irons 48 is a screen 49 which is also inclined forwardly and upwardly but at a somewhat greater angle than the normal angle of repose of the belt 35 and its carrying frame 29, and this inclined screen 49 is located in proximity to the guide wheels 12 and below the forward swinging end portion of the belt carrying frame 29. The screen 49 thus forms a reaction member or ramp for the sod as it is rolled forwardly by the belt 35 as shown in FIG. 3, the rear end of the screen 49 being located adjacent to the ground with the front end of the screen terminating above the front guide wheels 12, and attached to the upper forward ends of the braces 48 and extending transversely across the screen to, in effect, form an extension thereof is a plate 50.

Forwardly of the front guide wheels 12 and the screen 49, a pair of rollers 51, 52 are journalled for rotation in suitable bearings 53, 54 secured to the opposite sides of the frame 10, and an endless conveyor belt 55 carried by the rollers 51, 52 traverses the front end of the frame 10 below the extension plate 50. To drive the endless belt conveyor 55, a power take-off shaft 56 journalled for rotation in a bearing 57 secured to one of the sides of the frame 10 is connected at one end by a universal joint 58 to the shaft of the roller 51, and the power take-off and roller drive shaft 56 may be driven in any suitable manner as by a belt 59 driven by the shaft 40 through a pulley or sheave 60 keyed thereto and in turn driving a sheave 61 keyed to the shaft 56. Thus, the successive rolls of sod are rolled up the ramp screen 49 by the open mesh sod rolling belt 35 and are deposited on the conveyor belt 55 which then carried them transversely across the frame for lateral discharge therefrom, and to prevent the sod rolls from falling off the transverse conveyor 55, a suitable guard rail 62 having its legs 63 secured to the sides of the frame 10 may be provided as shown. Also, a side delivery ramp 64, as shown in FIG. 4, may be provided if desired to more positively guide the successive rolls of sod as they are discharged by the conveyor 55.

Since it is desirable to provide a means for adjusting the tension on the transmission belt 38 which cooperates with the sheaves 37, 39 to drive the open mesh belt 35 through the chain and sprocket wheel arrangement above described, an idler pulley 65 for applying more or less tension to the belt 38 is provided. As shown, the pulley 65 is rotatably carried by one end of a fulcrum lever 66 which has its other end pivotally carried by a bracket 67 secured to the platform 15, the lever being swingable about its pivot at the will of the operator by means of a lever 68 pivotally amounted on one of the manipulating handles 13 as by means of a bracket 69, a link 70 being interposed between the manipulating lever 68 and the lever 66 carrying the idler pulley 65. Also, to actuate the clutch 23 associated with the drive wheels 11, a handled lever 71 is swingably mounted on the other manipulating handle 13 and is connected as by means of a link 72 with a bell crank 73 having the other arm thereof connected to the clutch 23 by means of a motion transmitting link 74, the clutch therefore being likewise readily manipulable by the operator of the machine to propel the same in a forward direction whenever desired.

In operation, the internal combustion engine 14 is initially started in a customary manner. Tension is then placed on the belt 38 by means of the idler pulley 65, the tension being adjusted by means of the handled lever 68. With the engine 14 operating and with tension placed on the power transmitting belt 38, the open mesh belt 35 is driven in the direction of the arrow in FIG. 1. The sod having been cut into strips 75 by a sod cutter, one of the sod strips is initially removed in order to commence the sod rolling operation. The drive wheels 11 thereby propel the frame 10 in a forwardly direction as indicated by the arrow in FIG. 1, and as the machine is advanced, the edge of the next successive strip of sod 25 is contacted by the endless open mesh belt 35 and the end of the strip is caused to roll upon itself. As the machine progresses, the rolling action continues and the rolled sod is advanced at a somewhat more rapid rate than the machine is driven until it reaches the screen 49 whereupon it is rolled upwardly and forwardly along the screen and then deposited upon the endless conveyor 55 in finally rolled form. The roll of sod is then deposited laterally of the frame by the endless conveyor 55, and if desired, a wagon or other carrying vehicle may be simultaneously advanced with the improved sod handling machine to receive the sod rolls as they are discharged. The operation thus described continues without interruption, and successive strips of sod are automatically rolled into successive bundles and are conveyed to a point laterally of the machine.

The frame 10 may be conveniently and economically formed of angle iron stock and is of generally L-shape in side elevation. Likewise, the frame 29 for the endless mesh belt 35 may be formed of channel bar or angle iron stock with the bearing blocks 32 being slidable longitudinally therealong to adjusted position by means of the jack screw 46. The belt 35, being of open mesh as shown in FIG. 8, effectively grips the edge of each successive sod strip and acts to forcibly roll the strip along the inclined runway 49, and since the runway 49 is in the form of a screen, excessive loose ground is permitted to freely fall therethrough thus resulting in a neat final sod roll. The chain or cable 30 may be manipulated at the convenience of the operator to retain the upper end of the open mesh belt 35 out of contact with the inclined reaction ramp 49, 50 while permitting the belt 35 to swing upwardly about the shaft 26 as the sod roll 75 is advanced along the ramp, and the weight of the frame 29 and belt 35 against the sod roll insures continued forcible rolling and advancement of the sod. Also, the location of the engine 14 and most of the power transmission mechanism on the platform 15 above the drive wheels 11 aids in insuring good ground engaging contact of the drive wheels which are spaced rather closely together so as to travel within the recess formed in the ground upon removal of the successive strips of sod. The clutch 23 may, of course, be of any well-known and commercially available type permitting selective engagement at the will of the operator, and the front end of the machine may be supported either on a pair of spaced wheels or on a roller 12 at any desired height. The improved sod harvesting machine has, in fact, proven highly satisfactory in actual use, and the sod rolls produced by the open mesh belt 35 are extremely neat and easy to handle.

Various modes of carrying out the invention are contemplated as being within the scope of the following claims particularly pointing out and distinctly claiming the subject matter which is regarded as the invention.

I claim:

1. A sod harvesting machine comprising, a frame provided with ground engaging wheels, an endless belt inclined upwardly in the direction of travel swingably carried by said frame with its lower end positioned to engage an end edge of a sod strip to be rolled, means for advancing said frame along the ground on said wheels, means for driving said endless belt in a direction reverse to the direction of rotation of said wheels to thereby roll the sod strip engaged by said belt as said frame traverses an initial sod rolling zone and an upwardly inclined ramp carried by said frame below the inclined upper portion of said endless belt for receiving the sod strip as it is rolled by said belt, said belt and said ramp cooperating to continue rolling of the sod strip while advancing the same away from the initial sod rolling zone.

2. A sod harvesting machine according to claim 1, wherein the endless sod engaging and rolling belt is of open mesh construction.

3. A sod harvesting machine according to claim 1, wherein the endless sod engaging and rolling belt is driven at a faster rate of speed than the rate of advancement of the frame.

4. A sod harvesting machine according to claim 1, wherein the inclined ramp is fixed relative to the frame and is also inclined relative to the normal position of the endless sod engaging and rolling belt so as to converge toward the upper end thereof.

5. A sod harvesting machine according to claim 2, wherein the inclined ramp is also of open mesh construction.

6. A sod harvesting machine comprising, a frame provided with ground engaging wheels, an endless belt inclined upwardly in the direction of travel swingably carried by said frame with its lower end positioned to engage an end edge of a sod strip to be rolled, means for advancing said frame along the ground on said wheels, means for driving said endless belt in a direction reverse to the direction of rotation of said wheels to thereby roll the sod strip engaged by said belt as said frame traverses an initial sod rolling zone, an upwardly inclined ramp carried by said frame below the inclined upper portion of said endless belt for receiving the sod strip as it is rolled by said belt, and a conveyor operating transversely of and carried by said frame below the upper end of said ramp, said belt and said ramp cooperating to continue rolling of the sod strip while advancing the same away from the initial sod rolling zone and on to said conveyor for subsequent delivery laterally of said frame.

7. A sod harvesting machine according to claim 6, wherein the sod delivery conveyor is an endless belt carried by rollers mounted on opposite sides of the frame.

8. A sod harvesting machine comprising, a frame provided with ground engaging wheels, means carried by said frame for driving said wheels in a direction to advance said frame, an endless belt inclined upwardly in the direction of travel swingably carried at its lower end by said frame forwardly of said wheels with its lower end positioned to engage an end edge of a sod strip to be rolled, means carried by said frame for driving said endless belt in a direction reverse to the direction of rotation of said wheels to thereby roll the sod strip engaged by said belt as said frame traverses an initial sod rolling zone, and an upwardly inclined ramp fixedly mounted on said frame below the inclined upper portion of said endless belt for receiving the sod strip as it is rolled by said belt, said belt and said ramp cooperating to continue rolling of the sod strip while advancing the same away from the initial sod rolling zone.

9. A sod harvesting machine according to claim 8, wherein a common prime mover positioned above the driven wheels is employed as the means for driving both the wheels and the endless belt.

10. A sod harvesting machine according to claim 8, wherein the endless sod engaging and rolling belt is of open mesh construction and the driving means therefore includes a sprocket wheel, the teeth of which drivingly coact directly with said open mesh belt.

11. A sod harvesting machine according to claim 8, wherein the endless sod engaging and rolling belt and the ramp are also inclined relative to each other so as to converge at their upper ends in the direction of advancement of the sod, the upper end of said belt being freely swingable away from said ramp by the roll of sod as it is advanced thereby.

12. A sod harvesting machine according to claim 11, wherein means are provided for adjustably limiting the extent of downward swinging movement of the endless belt.

13. A sod harvesting machine according to claim 8, wherein the means for swingably carrying the endless sod engaging and rolling belt consists of an elongated frame pivotally mounted at its lower end forwardly of the driven wheels to the main frame.

14. A sod harvesting machine comprising, a frame provided with rear ground engaging drive wheels, means carried by said frame for driving said wheels in a direction to advance said frame, a forwardly and upwardly inclined endless belt swingably carried at its lower end by said frame forwardly of said wheels with its lower end positioned to engage an end edge of a sod strip to be rolled, means carried by said frame for driving said endless belt in a direction reverse to the direction of rotation of said wheels at a greater linear speed than the peripheral speed of said wheels to thereby roll the sod strip engaged by said belt as said frame traverses an initial sod rolling zone, a forwardly directed and upwardly inclined ramp fixedly mounted on said frame below the inclined upper portion of said endless belt for receiving the sod strip as it is rolled by said belt, a conveyor operating transversely of and carried by said frame below the upper end of said ramp, said belt and said ramp cooperating to continue rolling of the sod strip while advancing the same away from the initial sod rolling zone and on to said conveyor for subsequent delivery laterally of said frame, and ground engaging means at the forward end of said frame below said conveyor for supporting the same at a given height above ground.

References Cited in the file of this patent
UNITED STATES PATENTS

| | | |
|---|---|---|
| 2,778,292 | Kavan | Jan. 22, 1957 |
| 2,872,989 | Hadfield | Feb. 10, 1959 |
| 2,987,124 | Hadfield | June 6, 1961 |